United States Patent [19]
Kotowski

[11] 4,336,562
[45] Jun. 22, 1982

[54] H-SWITCH HAVING SHORT TO PLUS PROTECTION

[75] Inventor: Thomas W. Kotowski, Noblesville, Ind.

[73] Assignee: General Motors Corporation, Detroit, Mich.

[21] Appl. No.: 237,283

[22] Filed: Feb. 23, 1981

[51] Int. Cl.³ .............................................. H02H 3/20
[52] U.S. Cl. ........................................ 361/88; 361/91; 361/98; 318/257; 318/294
[58] Field of Search ..................... 361/88, 98, 89, 187, 361/18, 91; 318/294, 257, 256, 280, 293, 345 B, DIG. 1; 363/16, 17, 131, 132, 50, 55, 56, 58

[56] References Cited
U.S. PATENT DOCUMENTS

| 3,110,851 | 11/1963 | Plogstedt et al. | 318/294 |
| 3,846,684 | 11/1974 | Jossic | 318/257 |
| 4,017,765 | 4/1977 | Maisch | 361/88 |

Primary Examiner—Patrick R. Salce
Attorney, Agent, or Firm—Howard N. Conkey

[57] ABSTRACT

An H-switch driver circuit includes two pairs of opposed drive transistors each pair being selectively energized to control the polarity of power applied to a load. Each pair of transistors is energized by a power current mirror that includes an NPN transistor that supplies base drive current to the remaining transistors in the power current mirror. The emitter of the NPN transistor is coupled to the load. The NPN transistor is biased off to inhibit base drive current to the circuit transistors in the event of a short to plus fault at one of the load terminals.

2 Claims, 1 Drawing Figure

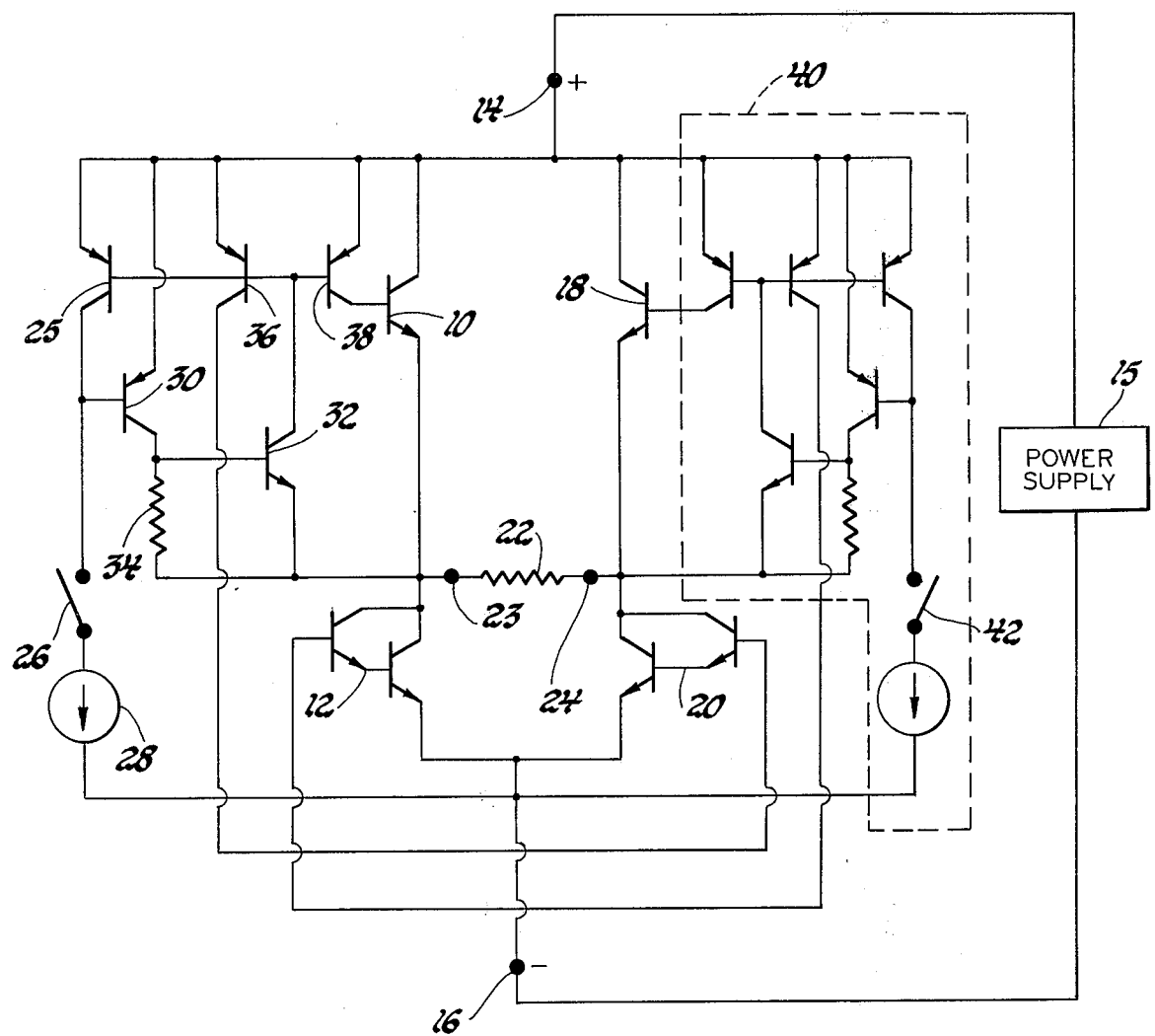

H-SWITCH HAVING SHORT TO PLUS PROTECTION

This invention relates to a transistor switch circuit having short to plus fault protection.

When an H-switch is utilized to control the polarity of power applied to a load such as a DC motor to control the direction of rotation of its output shaft, the potential exists for permanent damage to the driver circuit if one of the output terminals is shorted to the positive terminal of the power supply and one of the lower transistors in the H-switch is turned on resulting in a short through the transistor to the negative terminal of the power supply.

It is the general object of this invention to provide for an improved driver circuit for an H-switch having short to plus protection.

It is another object of this invention to provide for an H-switch and driver circuit therefor in which all of the transistors are maintained nonconductive in response to a short to plus to provide for protection of the H-switch transistors.

The foregoing objects of this invention may be best understood by reference to the single figured drawing in which the H-switch and driver circuit therefor having short to plus protection is illustrated.

Referring to the drawing, an H-switch is illustrated that is basically comprised of NPN load energizing transistors 10 and 12 series coupled between a positive terminal 14 of a DC power supply 15 and a negative terminal 16 of the power supply 15 and NPN transistors 18 and 20 series connected between the positive and negative terminals 14 and 16. The transistors 12 and 20 are illustrated as Darlington transistors in the drawing. A load impedance 22 is coupled between a pair of circuit output terminals 23 and 24 provided at the junction between the transistors 10 and 12 and the junction between the transistors 18 and 20 and may take the form, for example, of the winding of a DC motor. The H-switch functions to couple the voltage at the terminals 14 and 16 of the power supply 15 across the load impedance 22 with the polarity of the voltage across the load impedance being determined by selectively turning on the diagonal pairs of the transistors 10, 12, 18 and 20. For example, the voltage at the terminals 14 and 16 may be applied across the load impedance 22 with one polarity by energizing the transistor pair 10 and 20 and the voltage at the terminals 14 and 16 may be applied across the load impedance in an opposite polarity by energizing the transistor pair 12 and 18.

Typically, the output terminals 23 and 24 and the load impedance 22 is coupled to a point external from the H-switch circuit by leads coupled to the junction between the transistors 10 and 12 and the transistors 18 and 20. This exposes the output transistors 10, 12, 18 and 20 to possible electrical overstress. One such hazard is a short to the positive terminal 14 of the power supply resulting in the potential at the collector electrode of one of the lower transistors 12 or 20 being coupled directly to the positive terminal 14. If that transistor were subsequently energized, a direct short across the terminals 14 and 16 is provided which could damage the conducting lower transistor.

In accord with this invention, driver circuits are provided for selectively energizing the transistor pairs 10 and 20 or 12 and 18 which provide for short to plus protection to prevent damage to the lower transistors 12 and 20 in the event of a short to plus fault.

The driver circuits for energizing the diagonal transistor pairs 10–20 and 12–18 each takes the form of a power current mirror. The power current mirror for driving the load energizing transistor pair 10 and 20 includes a PNP transistor 25 whose emitter is coupled to the positive terminal 14 and whose collector is coupled through a switch 26 to a current source 28 the other side of which is coupled to the negative terminal 16. The current mirror also includes a PNP transistor 30 having its emitter coupled to the positive terminal 14 and its collector coupled to the base of an NPN transistor 32 and to the output terminal 23 through a resistor 34. The emitter of the transistor 32 is coupled to the output terminal 23 and its collector is coupled to the base electrode of the transistor 25 and the base electrodes of a pair of driver transistors 36 and 38. The base and emitter electrodes of the transistors 36 and 38 are parallel coupled with the base and emitter electrodes of the transistor 25. The collector of the driver transistor 36 is coupled to the base of the load energizing transistor 20. The collector of the driver transistor 38 is coupled to the load energizing transistor 10.

The transistor 25 of the current mirror establishes the base-emitter voltage of the transistors 36 and 38. This voltage is set by its collector current which equals the constant reference current provided by the current source 28 when the switch 26 is closed to energize the load impedance 22 minus the small base current demanded by the transistor 30. The transistor 30 cannot supply the current required to drive the transistors 36 and 38. Accordingly, the transistor 32 is provided as an intermediate driver. Connecting the emitter of the transistor 30 to the positive terminal 14 as opposed to the base of the transistor 25 provides for a low output saturation voltage for the transistor 10.

When the switch 26 is closed, to energize the load 22, the transistor 30 is biased conductive to supply base drive current to the transistor 32 which is enabled to conduct as a result of the leakage current through the Darlington transistor 12. Conduction of the transistor 32 establishes the base currents of the transistors 25, 36 and 38 which are biased conductive. The transistors 36 and 38 in turn supply base drive currents to the load energizing transistors 10 and 20 which are biased on to apply the voltage of the voltage source 15 across the load impedance 22. If the leakage current through the Darlington transistor 12 is inadequate for biasing the transistors 32, 25, 36 and 38 conductive when the switch 26 is initially closed, a high impedance current source may be provided between the emitter of the transistor 32 and the negative terminal 16 to provide adequate drive current.

The transistors 10 and 18 normally isolate the output terminals 23 and 24 from the positive terminal 14 when the load impedance is deenergized. However, if a short to plus fault condition exists at the load terminals 23 or 24, this isolation does not exist and the voltage at the emitter of the transistor 32 is the voltage of the positive terminal 14. When this condition exists, the transistor 32 cannot be biased conductive when the switch 26 is closed. Since the transistor 32 is the sole means by which base drive currents are supplied to the transistors 25, 36 and 38, all of the transistors are maintained nonconductive during the period of the short to plus fault condition to provide overload protection for the transistor 20.

Similarly, a power current mirror 40 functions to bias the load energizing transistors 12 and 18 conductive to apply the voltage at the terminals 14 and 16 across the load impedance 22 with an opposite polarity in response to the closure of a switch 42 during fault-free conditions. However, in the event that one of the output terminals is shorted to the positive terminal 14, the power current mirror 40 is inhibited from energizing the transistors 12 and 18 to provide short to plus protection in the same manner as described with respect to the transistors 10 and 20.

In summary, all of the transistors will get base drive current only in the event a ground path is provided for the emitter current of the transistor 32 and the corresponding transistor in the current mirror 40. When this ground path is removed by a short of one of the load terminals 23 and 24 to the positive voltage terminal 14, all of the transistors are inhibited from conduction to provide for the short circuit protection.

The description of the preferred embodiment for the purpose of illustrating the invention is not to be considered as limiting or restricting the invention, since many modifications may be made by the exercise of skill in the art without departing from the scope of the invention.

The embodiments of the invention in which an exclusive property or privilege is claimed are defined as follows:

1. A switching circuit having short circuit protection comprising:

a power supply having positive and negative voltage terminals;

a load impedance;

a first load energizing transistor having emitter and collector electrodes coupled between one side of the load impedance and the negative voltage terminal of the power supply and having a base electrode;

a second load energizing transistor having emitter and collector electrodes coupled between the other side of the load impedance and the positive voltage terminal of the power supply and having a base electrode, the second load energizing transistor providing isolation between the load impedance and the positive voltage terminal of the power supply when biased nonconductive;

a first driver transistor having an output electrode coupled with the base electrode of the first load energizing transistor and having a base electrode effective when supplied with turn-on bias current to bias the first load energizing transistor conductive to couple the negative voltage terminal of the power supply to the load impedance;

a second driver transistor having an output electrode coupled with the base electrode of the second load energizing transistor and having a base electrode effective when supplied with turn-on bias current to bias the second load enegizing transistor conductive to couple the positive voltage terminal of the power supply to the load impedance; and means effective to selectively energize the load impedance, said last-mentioned means including an NPN transistor having a collector coupled with the base electrodes of the first and second driver transistors, an emitter electrode coupled to the load impedance and a base electrode, and means effective to selectively supply current from the positive voltage terminal of the power supply to the base electrode of the NPN transistor to selectively energize the load impedance, whereby when the first and second load energizing transistors are deenergized and the load impedance is normally isolated from the positive voltage terminal by the second load energizing transistor, a short between the load impedance and the positive voltage terminal of the voltage supply is effective to short the base and emitter electrodes of the NPN transistor to inhibit conduction of all of the transistors and provide short circuit protection for the first load energizing transistor.

2. An H-switch having short to plus protection comprising, in combination:

a power supply having a positive and negative voltage terminals;

first and second output terminals;

a load impedance coupled between the first and second output terminals;

a first load energizing transistor coupled between the positive voltage terminal and the first output terminal;

a second load enegizing transistor coupled between the positive voltage terminal and the second output terminal;

a third load energizing transistor coupled between the negative voltage terminal and the first output terminal;

a fourth load energizing transistor coupled between the negative voltage terminal and the second output terminal;

a first driver circuit selectively operable to bias the first and fourth load energizing transistors conductive to energize the load impedance with a first polarity; and a second driver circuit selectively operable to bias the second and third load energizing transistor conductive to energize the load impedance with an opposite polarity, each of the first and second driver circuits including a first driver transistor having an output electrode coupled with the base electrode of the load energizing transistor coupled to the negative voltage terminal and having a base electrode effective when supplied with turn-on bias current to bias the load energizing transistor coupled therewith conductive to couple the negative voltage terminal of the power supply to the load impedance, a second driver transistor having an output electrode coupled with the base electrode of the load energizing transistor coupled to the positive voltage terminal and having a base electrode effective when supplied with turn-on bias current to bias the load energizing transistor coupled therewith conductive to couple the positive voltage terminal of the power supply to the load impedance, an NPN transistor having a collector coupled with the base electrodes of the first and second driver transistors, an emitter electrode coupled to one of the output terminals and a base electrode, and means effective to selectively supply current from the positive voltage terminal of the power supply to the base electrode of the NPN transistor to selectively energize the load impedance, whereby when the load energizing transistors are de-energized a short between the load impedance and the positive voltage terminal of the voltage supply is effective to short the base and emitter electrodes of the NPN transistor to inhibit conduction of all of the transistors and provide short circuit protection for the load energizing transistors.

* * * * *